Patented June 25, 1946

2,402,665

UNITED STATES PATENT OFFICE 2,402,665

CHEMICAL PROCESS

William J. Peppel and Frank K. Signaigo, Wilmington, Del., assignors to E. I. du Pont de Nemours & Company, Wilmington, Del., a corporation of Delaware No Drawing. Application November 12, 1942, Serial No. 465,392

16 Claims. (Cl. 260—609)

This invention relates to a chemical process and more particularly it relates to a catalytic process for the preparation of hydroxythiols.

Aliphatic hydroxythiols are a potentially important class of organic sulfur compounds. They possess the high degree of reactivity characteristic of aliphatic thiols, and have moreover certain unique properties due to the presence of both hydroxyl and sulfhydryl groups in the molecule. The known methods for obtaining compounds of this class are of limited utility due to the unavailability of suitable starting materials, the high cost of the operations and reagents involved, and the low yields and extensive side reactions encountered.

This invention has, accordingly, as its object an improved process for the preparation of aliphatic hydroxythiols. Another object is the conversion of aliphatic hydroxymultisulfides to hydroxythiols by an economical catalytic method. Other objects will be apparent from the following description of the invention.

These objects are accomplished by reacting an aliphatic hydroxymultisulfide with hydrogen in the presence of a sulfactive hydrogenation catalyst.

In practicing this invention, an aliphatic hydroxymultisulfide, usually obtainable by the reaction of a halohydrin with an alkali metal polysulfide, is charged into a hydrogenation autoclave, together with a sulfactive hydrogenation catalyst such as cobalt sulfide. A solvent may be employed also if desired. The autoclave is then charged with hydrogen at superatmospheric pressure and agitated and heated to a temperature at which hydrogen is absorbed at a suitable rate. Usually a temperature within the range from about 75° C. to about 200° C. will be satisfactory. After the reaction is complete as evidenced by no further absorption of hydrogen, the autoclave is cooled and the reaction mixture is filtered to separate the catalyst. The crude hydroxythiol may then be isolated and purified by the usual methods of distillation, crystallization, or solvent extraction. The following examples show in greater detail the practice of this invention. The amounts of materials referred to are in terms of parts by weight unless otherwise noted.

Example I

A sulfactive hydrogenation catalyst is prepared as follows: A solution of 240 parts of sodium sulfide nonahydrate and 64 parts of sulfur in 1500 parts of water is added with stirring to a solution of 240 parts of cobalt chloride hexahydrate in 1500 parts of water. The black precipitate is filtered with suction and washed substantially free from soluble salts with water. Since the catalyst oxidizes spontaneously when exposed to air with resulting loss in catalytic activity, it is stored and used as an aqueous paste, or alternatively the precipitate after washing with water is washed with a suitable organic solvent to remove most of the water, and stored and used as a non-aqueous paste.

This catalyst is used to convert an aliphatic hydroxymultisulfide to a thiol as follows: One hundred-fifty parts of bis-hydroxyethyl trisulfide obtained by the reaction of ethylene chlorohydrin with sodium trisulfide is charged into an autoclave together with 10 parts of cobalt trisulfide catalyst pasted with ethanol and prepared as described above. The autoclave is then pressured with hydrogen and heated at 150° C. for 2 hours at a pressure of 1400 to 2500 lbs./sq. in. Additional hydrogen is added from time to time to replace that absorbed. After this period the autoclave is cooled and the product is filtered to separate the catalyst and the filtrate fractionally distilled. The principal product boiling at 62–67° C./22 mm. consists of ethylene monothioglycol. In addition to this compound there is also formed some ethane-dithiol and condensation products of ethylene monothioglycol. The principal reaction may be formulated as follows:

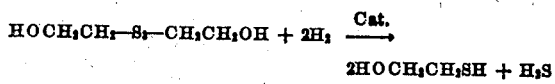

Example II 1,2-dithioglycerol is prepared in the following manner: 1537 parts of sodium monosulfide nonahydrate and 411 parts of powdered sulfur are dissolved with stirring in 1345 parts of water. Magnesium hydroxide is precipitated in the stirred sodium trisulfide solution by adding successively 97 parts of sodium hydroxide dissolved in 180 parts of water and then slowly 246 parts of magnesium chloride hexahydrate dissolved in 180 parts of water. The magnesium hydroxide serves as a dispersing agent to maintain the resulting sulfide polymer in finely divided condition. The mixture is heated and stirred at 50° C. while 1329 parts of glycerol 1,2-dibromohydrin is added continuously during a period of 1.5 hours. The reaction is exothermic and external cooling is employed to maintain the temperature within the range of 50–55° C. After the addition of the dibromohydrin is complete, the mixture is stirred and heated at 75° C. for 6 hours.

The finely divided yellow sulfide polymer formed is then allowed to settle and the reaction liquor is separated by decantation. The product is washed by decantation five times with water and finally filtered by suction. The moist cake of polymer is then air dried. The yield is 988 parts including approximately 75 parts of magnesium hydroxide.

Thirty-two hundred fifty parts of the hydroxypropylene trisulfide containing magnesium hydroxide is charged into a steel autoclave equipped with a mechanical agitator. There is also charged into the autoclave 2550 parts of dry dioxane and 350 parts of cobalt trisulfide catalyst prepared in the same way as in Example I and pasted with 700 parts of dioxane. Hydrogen is charged into the autoclave to a pressure of 1000 lbs./sq. in. and the autoclave is heated to a temperature of 125° C. during 1.5 hours, agitation being employed during this operation. When the temperature reaches about 110° C. the pressure commences to drop and is kept between the limits of 1000 and 1300 lbs./sq. in. by the addition of hydrogen. When the temperature reaches 125° C. the pressure is raised to 1700 lbs./sq. in. with hydrogen. The rate of hydrogenation increases as the temperature rises and the process is about complete when a temperature of 125° C. is reached. After the hydrogen absorption ceases, the autoclave is cooled, vented, and the reaction mixture is filtered to separate the catalyst. The filtrate is then heated on a steam bath at 60–80 mm. pressure to remove the dioxane. The less volatile residue consists of 1933 parts of crude dithioglycerol, a viscous oil.

1,2-dithioglycerol is isolated from the oil by distillation from an oil heated pot through a short still. The distillation is carried out at a pressure of less than 1 mm. and at a bath temperature of 120–175° C., the dithioglycerol distilling over at a head temperature of 60–65° C./0.2 mm. or 75–80° C./0.8 mm. Starting from 550 parts of crude dithioglycerol, 340 parts of distillate is obtained which contains 53% of mercapto sulfur and is nearly pure 1,2-dithioglycerol. The overall yield of dithioglycerol from the glycerol dibromohydrin is 48% of theoretical.

In addition to the dithioglycerol, a minor amount of lower boiling thiol is obtained. The principal by-product is a non-volatile viscous syrup containing approximately 28% of mercapto sulfur and 48% of total sulfur and is presumably a mixture of condensation products of dithioglycerol.

The refined dithioglycerol may be further purified by fractional distillation at 5–10 mm. pressure through an efficient fractionating column. The purified material has the following properties:

| Vapor pressure (mm. Hg) | 1.9 | 2.4 | 3.6 | 9.7 | 15 | 25 | 40 |
|---|---|---|---|---|---|---|---|
| at Temperature (° C.) | 80 | 90 | 100 | 110 | 120 | 130 | 140 |
| Density $d_4^{25}$ | | | | | | | 1.2385 |
| Refractive index $N_D^{25}$ | | | | | | | 1.5720 |
| Solubility in water | | | | | | | 8.7 g./100 g. water |

ANALYSIS

| | Found | Calculated |
|---|---|---|
| Carbon | 29.0 | 29.0 |
| Hydrogen | 6.4 | 6.5 |
| Sulfur | 51.2 | 51.6 |
| Mercapto sulfur | 51.8 | 51.6 |

In a like manner the hydroxypropylene trisulfide is converted to 1,2-dithioglycerol by carrying out the hydrogen reduction in the presence of a nickel catalyst. Instead of charging the cobalt polysulfide catalyst described above there is charged into the autoclave the same weight of hydrogen reduced nickel-on-kieselguhr catalyst and the reaction is carried out at 150° C. The results are similar to those described above.

*Example III*

Polymeric hydroxytrimethylene trisulfide is obtained by treating glycerol 1,3-dichlorohydrin with sodium trisulfide at 80° C. This hydroxymultisulfide is converted in high yield to 1,3-dithioglycerol by reaction with hydrogen at superatmospheric pressure in the presence of a sulfactive catalyst using the same catalyst and under the same conditions as that described in the preceding example for the preparation of 1,2-dithioglycerol (Example II).

Analogously the hydroxymultisulfide obtained by the reaction of dichloro-tert.-butanol with sodium polysulfide is converted by catalytic hydrogenation to dimercapto-tert.-butanol.

*Example IV*

The process for converting hydroxymultisulfides to hydroxythiols in high yields finds application in the purification of certain polyhydroxythiols. For example, 1-thiosorbitol,

$CH_2OH(CHOH)_4CH_2SH$ may be recovered in a pure state from mixtures of this compound with other materials formed during its preparation or use, by oxidizing the crude mixture with iodine, hydrogen peroxide or other suitable reagents so that the hydroxythiol is converted to the less soluble, higher melting and more easily crystallized bis-1-sorbityl disulfide. The 1-thiosorbitol is then regenerated from the hydroxymultisulfide as follows: 75 parts of the disulfide is charged into a hydrogenation autoclave together with 100 parts of water and an aqueous paste of cobalt sulfide catalyst containing 8 parts of cobalt sulfide, prepared as in Example I. Hydrogen is added to the autoclave to an initial pressure of 1000 lbs./sq. in. at 25° C., the autoclave is sealed and then agitated and heated at a temperature of 125° C. for 1 hour. After this period the autoclave is cooled, the reaction mixture is filtered from the catalyst and the filtrate is heated at 100° C. under reduced pressure to remove the water. The residue consists of 69 parts of nearly pure 1-thiosorbitol in the form of a viscous syrup. The latter is dissolved in hot anhydrous ethanol and from the cooled solution 1-thiosorbitol separates as a white crystalline solid melting at 89–92° C.

This transformation of bis-1-sorbityl disulfide into 1-thiosorbitol is also accomplished by operating in a manner similar to that described above except that instead of the cobalt sulfide catalyst there is employed an equal weight of finely divided active iron sulfide catalyst. The latter is prepared by treating at room temperature with hydrogen sulfide, iron powder obtained by extracting the aluminum with hot aqueous alkali from a powdered alloy of iron and aluminum. The hydrogenation operation is completed in a short time at 150° C. and the thiosorbitol is obtained in high yield.

*Example V*

4,4-bis-hydroxymethyl-1,2-dithiacyclopentane is prepared by treating pentaerythritol dibromide with sodium polysulfide. The product, crystallized from benzene, melts at 129–130° C. This cyclic hydroxymultisulfide is converted to a thiol as follows: 100 parts of the sulfide is charged into an autoclave with 100 parts of ethanol and 7 parts of a sulfactive cobalt sulfide catalyst. The autoclave is then charged with hydrogen to a pressure of 1000 lbs./sq. in. and heated and agitated at 115° C. for 1.5 hours. Additional hydrogen is added as needed to replace that absorbed and to maintain the pressure within the range from 800 to 2000 lbs./sq. in. After there is no further absorption of hydrogen, the autoclave is cooled and the reaction mixture is filtered from the catalyst and the solvent is distilled from the product at reduced pressure. The residue consists of solid crude dithiopentaerythritol. It is purified by recrystallization from benzene. There is thus obtained 71 parts of dithiopentaerythritol which may be further purified by recrystallization from ether to obtain a white crystalline product melting at 97° C. The reaction may be formulated as follows:

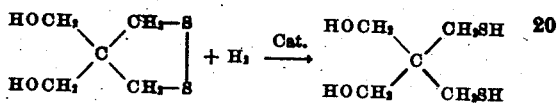

The conversion of various aliphatic hydroxymultisulfides to the corresponding hydroxythiols has been illustrated in the foregoing examples. This invention is, however, not limited to these particular materials, but is applicable generally to the conversion of other aliphatic hydroxymultisulfides. By the term "aliphatic hydroxymultisulfide" is meant an organic sulfur compound consisting of one or more aliphatic or cycloaliphatic hydrocarbon radicles bearing at least one hydroxyl group and attached to one or more groups of at least two sulfur atoms. The term therefore includes not only aliphatic hydroxydisulfides, but also the trisulfides, tetrasulfides, pentasulfides, etc. which are designated by the general name of aliphatic hydroxypolysulfides.

The aliphatic hydroxymultisulfides may be obtained by standard methods among which one of the most useful involves the reaction of a hydroxy halogen compound with an alkali metal polysulfide as illustrated in many of the foregoing examples. Other specific examples of aliphatic hydroxymultisulfides that may be converted to hydroxythiols by the process of this invention are the bis-hydroxyalkyl multisulfides, such as bis-hydroxyethyl disulfide, bis-beta-hydroxypropyl bisulfide and trisulfide, bis-gamma-hydroxypropyl multisulfides, bis-2,3-dihydroxypropyl multisulfides, bis-1,3 - dihydroxypropyl multisulfides, bis-hydroxybutyl multisulfides, bis-trihydroxybutyl multisulfides, bis-pentahydroxyhexyl multisulfides such as bis-sorbityl disulfide, bis-mannityl disulfide; bis - hydroxyclohexyl multisulfides. Other aliphatic hydroxymultisulfides that may be converted to aliphatic hydroxythiols by the process of this invention are the hydroxyalkylene multisulfides in which the sulfur atoms are on adjacent carbons and hydroxypolymethylene multisulfides in which the sulfur atoms are on terminal carbons. Such multisulfides are obtainable by the reaction of an aliphatic hydroxydihalogen compound with an alkali metal polysulfide. Examples of these are the hydroxypropylene multisulfides, hydroxybutylene multisulfides, dihydroxybutylene multisulfides, hydroxytrimethylene multisulfides, hydroxytetramethylene multisulfides, hydroxyhexamethylene multisulfides, tetrahydroxyhexamethylene multisulfides and the like. The alkylene and trimethylene multisulfides may exist as linear polymers or cyclic monomers. For example, hydroxypropylene trisulfide prepared as described in Example II exists mainly as a polymer. On the other hand, 4,4-bis-hydroxymethyl-1,2-dithiacyclopentane (Example V), a hydroxy containing trimethylene multisulfide, is a cyclic monomer. Other cyclic monomers which are convertible to hydroxythiols by the process of this invention are hydroxydithiacyclopentanes and -cyclohexanes and the hydroxytrithiacyclopentanes such as 4-hydroxy-1,2-dithiacyclopentane, 4 - hydroxymethyl-4-methyl-1,2 - dithiacyclopentane, 4,4-bis-hydroxymethyl-1,2 - dithio-1,2 - dithiacyclopentane, 4-hydroxymethyl - 1,2,3-trithiacyclopentane, 5 - hydroxy-1,2,3-trithiacyclohexane, and the like.

The multisulfide groups usually contain from two to five sulfur atoms. The following structures have been postulated for some of these:

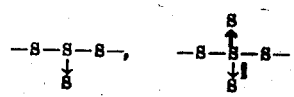

If the multisulfide group contains more than two sulfur atoms, the additional sulfur is usually converted to hydrogen sulfide when hydroxysulfides containing such groups are treated according to this invention.

Although not essential in all cases, solvents or liquid suspension media may be employed in carrying out the hydrogenation process. The use of liquid media is especially preferred for the conversion of solid polymeric hydroxymultisulfides. Examples of suitable materials are water and organic solvents such as hydrocarbons, alcohols, ethers, and the like. In addition to inert solvents, alkalis, ammonia, amines, or acids may be present, if desired.

The process of this invention may be operated over a considerable range of temperatures, usually from about 75 to 200° C. and in certain cases a slow conversion may be obtained even at room temperature. Since, however, the rate of reaction increases with temperature, it is usually more convenient to carry out the reaction at a temperature somewhat above the lower limits, and usually a temperature of the order of 100–175° C. is preferred. When the hydroxymultisulfides or hydroxythiols produced are sufficiently stable against thermal decomposition, temperatures of the order of 200° C. or even higher may be employed if desired. When the hydroxymultisulfide contains a hydroxyl group in the beta position to the multisulfide group, it is usually desirable to carry out the process in the low temperature range since at the higher temperatures the hydroxythiol produced may undergo self-condensation or reaction with any hydrogen sulfide present.

In most cases the reaction proceeds well even at low pressures of hydrogen, but in order to insure a practicable rate of reaction, it is desirable to operate at a hydrogen pressure of at least 100 lbs./sq. in. The maximum pressure depends upon the mechanical structural limits of the apparatus used. Since the reaction proceeds faster with higher pressures, it is preferred to operate at a pressure in excess of 500 lbs. Purified hydrogen is not essential for the practice of this invention, and instead, hydrogen mixed with other gases, such as nitrogen, hydrogen sulfide, etc. may be used.

Examples of sulfactive catalysts that may be used in carrying out the process of this invention are the sulfides of metals such as chromium, cobalt, copper, iron, lead, molybdenum, nickel, palladium, tin, tungsten, and vanadium. It is preferred, however, to use sulfides of the metals molybdenum, or the ferrous metals cobalt, nickel, and iron, since these have been found to be exceptionally active. Such catalysts may be prepared by a variety of methods, as, for example, by precipitating the metal sulfide from a solution of a metal salt with hydrogen sulfide, a solution of alkali or alkaline earth metal sulfides or polysulfides or with ammonium sulfide or polysulfides. Another method that has been found to yield very active hydrogenation catalysts is to treat the finely divided pyrophoric or activated metal suspended in a liquid medium with hydrogen sulfide or sulfur until sulfidation is substantially complete. Other methods for obtaining metal sulfide catalysts include heating powdered metals or metal compounds such as the oxides, carbonates or sulfides with volatile sulfiding agents such as sulfur, hydrogen sulfide, or carbon bisulfide.

The hydrogenating activity of metal sulfides may be increased in many instances by treatment with hydrogen at elevated temperature. The hydrogen treatment of the metal sulfide often can be combined conveniently into a single operation with the hydrogenation reaction for which the catalyst is to be used. Instead of charging the metal sulfide as such, it may be formed in situ by placing the finely divided pyrophoric or activated metal in the autoclave together with sulfur or hydrogen sulfide. The metal will then be converted to the active metal sulfide during the early stages of the reaction process. The catalyst employed may be substantially a pure metal sulfide or a combination of metal sulfides. Other substances may be present also as, for example, kieselguhr, alumina, magnesia, carbon, and other supporting or promoter materials.

Usually an amount of sulfactive catalyst of from 1 to 15% by weight of the sulfide to be converted will produce a satisfactory rate of reaction, although other proportions may be employed as convenient.

By the term "sulfactive hydrogenation catalyst" as used herein and in the claims, we mean a catalyst which is active for the catalytic hydrogenation of the sulfur in organic multisulfides, organic sulfur compounds having carbon to sulfur unsaturation, and organic sulfur compounds having sulfur to oxygen unsaturation. Suitable catalysts are described in U. S. Patents Nos. 2,221,804 and 2,230,390.

This invention constitutes a novel, useful, and economical process for converting aliphatic hydroxymultisulfides into the more reactive thiols, thus affording a new source of valuable chemicals for use as such, or as intermediates in the preparation of insecticides, rubber chemicals, dyestuffs, and the like. The process also is useful as a step in the purification of aliphatic hydroxythiols as described above.

As many apparently widely different embodiments of this invention may be made without departing from the spirit and scope thereof, it is to be understood that this invention is not to be limited to the specific embodiments shown and described.

We claim:
1. The process for the production of a hydroxythiol which comprises reacting an aliphatic hydroxymultisulfide with hydrogen in the presence of a sulfactive hydrogenation catalyst.
2. The process for the production of a hydroxythiol which comprises reacting a bis-hydroxyalkyl multisulfide with hydrogen in the presence of a sulfactive hydrogenation catalyst.
3. The process in accordance with claim 2 for the production of a polyhydroxythiol in which the hydroxymultisulfide is a bis-polyhydroxyalkyl multisulfide.
4. The process in accordance with claim 2 for the production of 1-thiosorbitol in which the polyhydroxyalkyl multisulfide is bis-1-sorbityl disulfide.
5. The process in accordance with claim 1 for the production of a hydroxydithiol in which the hydroxymultisulfide is a hydroxyalkylene multisulfide.
6. The process for the production of 1,2-dithio-glycerol which comprises reacting a hydroxypropylene multisulfide with hydrogen in the presence of a sulfactive hydrogenation catalyst.
7. The process in accordance with claim 1 for the production of a hydroxydithiol in which the hydroxymultisulfide is a hydroxypolymethylene multisulfide.
8. The process for the production of 1,3-dithio-glycerol which comprises reacting a hydroxytrimethylene multisulfide with hydrogen in the presence of a sulfactive hydrogenation catalyst.
9. The process in accordance with claim 1 characterized in that the sulfactive hydrogenation catalyst is a base metal sulfide.
10. The process in accordance with claim 1 characterized in that the sulfactive hydrogenation catalyst is a metal sulfide selected from the group consisting of the sulfides of metals of the ferrous metal group of the periodic table.
11. The process in accordance with claim 1 characterized in that the sulfactive hydrogenation catalyst is molybdenum sulfide.
12. The process for the production of 1-thiosorbitol which comprises reacting bis-1-sorbityl disulfide with hydrogen in the presence of a sulfactive metal sulfide hydrogenation catalyst selected from the group consisting of the sulfides of metals of the ferrous metal group of the periodic table.
13. The process for the production of 1,2-dithio-glycerol which comprises reacting a hydroxypropylene multisulfide with hydrogen in the presence of a sulfactive metal sulfide hydrogenation catalyst selected from the group consisting of the sulfides of metals of the ferrous metal group of the periodic table.
14. The process for the production of 1,3-dithio-glycerol which comprises reacting a hydroxytrimethylene multisulfide with hydrogen in the presence of a sulfactive metal sulfide hydrogenation catalyst selected from the group consisting of the sulfides of metals of the ferrous metal group of the periodic table.
15. The process in accordance with claim 13 characterized in that the reaction is carried out at a temperature within the range of 100° to 175° C. under a hydrogen pressure in excess of 500 lb./sq. in.
16. The process for the production of 1,2-dithio-glycerol which comprises reacting hydroxypropylene trisulfide polymer containing magnesium hydroxide with hydrogen in contact with a cobalt trisulfide sulfactive catalyst, said reaction being carried out in an inert medium of dioxane and at a temperature within the range of 100° to 125° C. and under a hydrogen pressure of 1000 to 1700 lb./sq. in.

WILLIAM J. PEPPEL.
FRANK K. SIGNAIGO.